No. 794,376.

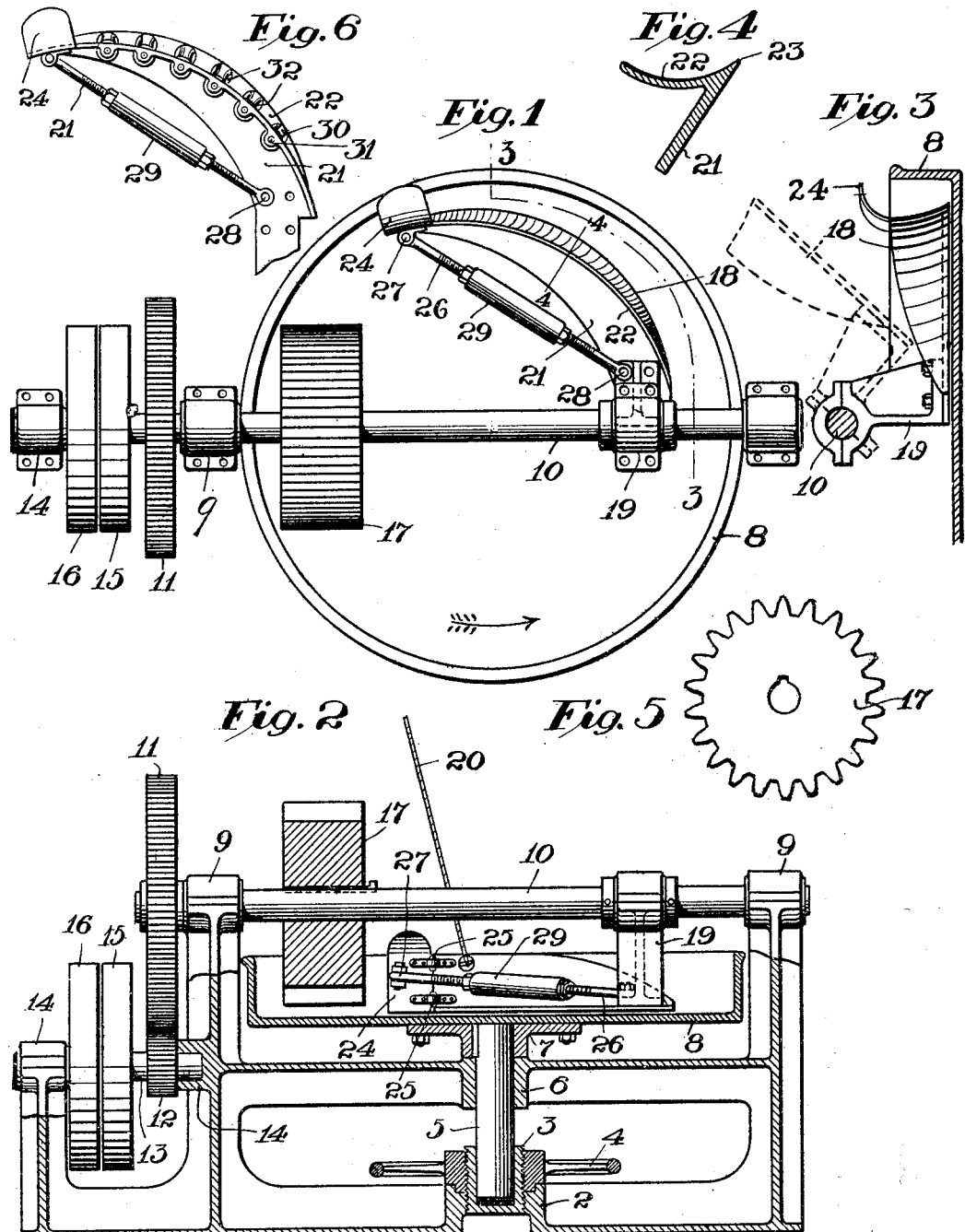

Patented July 11, 1905.

UNITED STATES PATENT OFFICE.

JOHN NAZEL, OF PHILADELPHIA, PENNSYLVANIA.

DOUGH-KNEADING APPARATUS.

SPECIFICATION forming part of Letters Patent No. 794,376, dated July 11, 1905.

Application filed January 30, 1905. Serial No. 243,185.

*To all whom it may concern:*

Be it known that I, JOHN NAZEL, a citizen of the United States, and a resident of Philadelphia, in the county of Philadelphia and State of Pennsylvania, have invented certain Improvements in Dough-Kneading Apparatus, of which the following is a specification.

In the manufacture of various food products, as macaroni, large batches of dough are required to be thoroughly worked, and in order to properly effect the kneading thereof the batch must be turned, so as to permit the mechanism operating thereon to work the mass uniformly and thoroughly. In apparatus heretofore employed it has been proposed to mechanically crush and turn batches of dough to effect the kneading required; but the mechanisms proposed for turning the same have been of such character that they have failed in practice to perform the operations successfully, and they have, moreover, been unadapted for handling batches of various size and character.

It is the object of the present invention to provide a simple apparatus that will simultaneously knead and turn the dough, so that it can be worked thoroughly and uniformly without limitation to a definite amount or character of the material operated upon.

In the accompanying drawings, Figure 1 represents a plan view of an apparatus embodying my improvements. Fig. 2 represents a vertical sectional view thereof. Fig. 3 represents a sectional view taken on the line 3 3 of Fig. 1. Fig. 4 represents a sectional view taken on the line 4 4 of Fig. 1. Fig. 5 represents a side elevation of the mixing-wheel, and Fig. 6 represents a plan view of a modified form of dough-turning mechanism.

As shown in the drawings, the frame 1 is provided with the socket 2, which receives a foot-step 3, having a screw-threaded engagement with a hand-wheel 4, supported upon the socket, the wheel adjusting the elevation of the foot-step. A vertical shaft 5, journaled in the foot-step and bearing 6, carried by the frame, has secured to the top thereof the flanged hub 7, which is fixed to the pan 8. The bearings 9, carried by the frame, have journaled therein the shaft 10, which is driven by the spur-wheel 11, fixed thereon, the spur-wheel being engaged by a driving-pinion 12, fixed on a shaft 13, which is journaled in the bearings 14 and carries the fast and loose pulleys 15 and 16. Fixed on the shaft 10 is a cogged wheel 17, which is revolved within the pan 8 to crush and knead the dough contained therein. To turn the dough crushed by the kneading-wheel, a plow 18 is held in the pan by means of its shoe 19, which connects it at its forward end to the shaft 10, and a cable or tension member 20, which supports its rearward end at the elevation desired, the shoe being journaled on the shaft and permitting the plow to be adjusted by means of the cable, so as to elevate it in or wholly remove it from the pan. The plow comprises a horizontally-extending web forming a base 21, which supports a wing 22, having a helicoidal or screw-like surface, the wing's lower edge gradually approaching the periphery of the pan from its forward to its rearward end and its body rising and receding therefrom in the twisting form adapted for lifting and turning the dough that has been flattened by the kneading-wheel. The wing has the heel or tail fin 24 connected to the rear end thereof by the hinges 25, the fin being set or adjusted by the rod 26, having the pivotal connection 27 therewith and the pivotal connection 28 with the shoe 19, the rod being variable in length by means of a turnbuckle 29, having screw-threaded engagements with the end sections thereof.

As shown in Fig. 6, concave spools or rollers 30, journaled in bearings, as 31, may be employed, being disposed so as to act in the openings 32 of the wing 22 and throw off the dough.

When the batch of dough is distributed in the pan 8, the kneading-wheel 17 is revolved and revolves the pan in the direction of the arrow through its engagement with the dough, which it draws thereunder, the dough being crushed thereby. As the crushed dough travels from the wheel it is carried against the plow, whose projecting edge 23 slides thereunder, lifting it, and the wing 22 gradually turns or twists it spirally while moving it toward the periphery of the pan, it being finally pressed to the position desired by the fin 24, which is curved to act upon the side and top thereof and is set as required by the character and quantity of the dough. As it leaves the plow the dough is delivered directly to the kneading-wheel, which again crushes and spreads it, to be again turned, and so on until worked to the condition required.

The low pitch and considerable length of the helicoidal wing causes the plow to operate upon a comparatively long section of the dough, which is subjected to a gradual twisting action, which upsets and delivers it in an entirely satisfactory manner.

It will be understood that the invention is not limited to the use of the single kneading-wheel shown, as a plurality of such wheels may be employed, and other changes may be made in the details of construction without departing from the spirit of my invention.

Having described my invention, I claim—

1. A kneading apparatus comprising a crushing device, and a turning device having an adjustable member hinged to the tail thereof, substantially as specified.

2. A kneading apparatus comprising a crushing device for kneading dough, and a wing having a fin pivotally connected to the tail thereof for turning the crushed dough, substantially as specified.

3. A kneading apparatus comprising stationary bearings, a shaft journaled in said bearings, a kneading device revolved by said shaft, a pan revolved by said kneading device, and a device journaled upon said shaft for turning the dough crushed by said kneading device, substantially as specified.

4. A kneading apparatus comprising a pan and a plow having a long helicoidal wing of low pitch arranged eccentrically with reference to said pan, substantially as specified.

5. A kneading apparatus comprising a rotary pan and a long normally stationary helicoidal wing of low pitch having a supporting-web, said wing being arranged eccentrically with reference to said pan, substantially as specified.

6. A kneading apparatus comprising a crushing device, a plow having a pivoted fin, and a rod connected to said fin for adjusting and holding it, substantially as specified.

7. A kneading apparatus comprising a journaled shaft, a kneading device revolved by said shaft, a rotary dough-pan revolved by the engagement of said kneading device with dough therein, a plow having its forward end connected in journaled relation to said shaft, said plow approaching the periphery of said pan as it extends rearwardly, and means for supporting the rear end of said plow, substantially as specified.

8. A kneading apparatus comprising a receptacle and plow having a set of rollers which act to upset dough contained in said receptacle, substantially as specified.

In testimony whereof I have hereunto set my hand, this 28th day of January, A. D. 1905, in the presence of the subscribing witnesses.

JOHN NAZEL.

Witnesses:
 ROBERT JAMES EARLEY,
 UTLEY E. CRANE, Jr.